United States Patent [19]
Plakosh et al.

[11] Patent Number: 5,825,991
[45] Date of Patent: Oct. 20, 1998

[54] SYSTEM FOR BALANCING CPU DEMANDS IN A HIGH-VOLUME PRINT SERVER

[75] Inventors: David Plakosh, Rochester; Michael A. Wiegand, Webster; Norman E. Wright, Rochester, all of N.Y.

[73] Assignee: Xerox Corporation, Stamford, Conn.

[21] Appl. No.: 550,312

[22] Filed: Oct. 30, 1995

[51] Int. Cl.$^6$ .................................................. G06T 11/00
[52] U.S. Cl. .......................... 395/115; 395/112; 345/521; 345/526
[58] Field of Search ................................. 345/418, 521, 345/523, 526, 512, 433; 395/112, 114, 115, 116

[56] References Cited

U.S. PATENT DOCUMENTS

| | | | |
|---|---|---|---|
| 4,288,860 | 9/1981 | Trost ........................................ | 711/167 |
| 4,896,337 | 1/1990 | Bushy, Jr. ............................... | 375/371 |
| 5,016,114 | 5/1991 | Sakata et al. ............................ | 358/404 |
| 5,075,874 | 12/1991 | Steeves et al. .......................... | 395/112 |
| 5,142,667 | 8/1992 | Dimperio et al. ....................... | 395/115 |
| 5,150,454 | 9/1992 | Wood et al. ............................. | 395/114 |
| 5,159,681 | 10/1992 | Beck et al. .............................. | 395/116 |
| 5,170,340 | 12/1992 | Prokop et al. ........................... | 364/143 |
| 5,226,112 | 7/1993 | Mensing et al. ........................ | 395/114 |
| 5,228,118 | 7/1993 | Sasaki ..................................... | 395/112 |
| 5,276,780 | 1/1994 | Sugiura ................................... | 395/116 |
| 5,293,466 | 3/1994 | Bringmann ............................. | 395/114 |
| 5,327,526 | 7/1994 | Nomura et al. ......................... | 395/115 |
| 5,371,837 | 12/1994 | Kimber et al. .......................... | 395/114 |
| 5,444,827 | 8/1995 | Briggs et al. ............................ | 395/115 |
| 5,479,587 | 12/1995 | Campbel et al. ....................... | 395/116 |
| 5,483,622 | 1/1996 | Zimmerman et al. .................. | 395/114 |
| 5,500,928 | 3/1996 | Cook et al. .............................. | 345/433 |
| 5,504,844 | 4/1996 | Ueda ....................................... | 395/115 |
| 5,602,976 | 2/1997 | Cooper et al. .......................... | 395/116 |
| 5,615,314 | 3/1997 | Schoenzeit et al. .................... | 395/114 |
| 5,619,624 | 4/1997 | Schoenzeit et al. .................... | 345/418 |

*Primary Examiner*—Tod R. Swann
*Assistant Examiner*—Yamir Encarnacion
*Attorney, Agent, or Firm*—R. Hutter

[57] ABSTRACT

A high-volume digital print service has a plurality of independent and simultaneously-operable decomposers which each output decomposed image data to a common buffer. The decomposed data can be compressed for relatively long-term retention in the buffer, by means of a compression element. All of the decomposers and the compression element are operated by a central CPU facility. A control system, sensitive to the amount of data in the buffer at a given time, apportions CPU cycles among the decomposers and compression element for optimization of the entire print service. The control system can also command printing hardware to skip pitches on an imaging surface therein, in order to reduce demand for decomposed data.

13 Claims, 3 Drawing Sheets

SYSTEM FOR BALANCING CPU DEMANDS IN A HIGH-VOLUME PRINT SERVER

Cross-reference is made to the following patent application, being filed concurrently herewith and assigned to the assignee of the present application: U.S. Pat. No. 5,715,379, for "Architecture for a Digital Printer with Multiple Independent Decomposers."

The present invention relates generally to controlling a high-volume print server, and more particularly to a system for controlling the apportionment of CPU cycles among different server functions, for optimizing overall performance.

Personal computers have become commonplace on the desks of most office workers. Typically, much of the work product of such computers is intended to be transformed into hardcopy via a printer using digital imaging technology. A typical printer configuration for this purpose comprises a dedicated printer coupled to the personal computer ("PC"). However, printers used for this purpose are typically small laser or ink-jet printers which have limited functions and features such as a limited tray capacity which restricts the number and types of copy sheets that can be used to make prints on, or which do not have a finishing capability, etc. More importantly small laser printers also typically handle only one page description language.

On the other hand, larger high speed laser printers normally have a great deal of finishing and copy sheet capability which would allow the PC user to have, for example, custom printing and finishing of his work product, an option which for many PC users would be desirable. In practice, the PCs can be used advantageously with a network printing system of the type combining a number of client inputs, such as the PCs, or the like, and one or more printer outputs. In one example of such network printing systems, a client at one of the inputs sends electronic documents that comprise a job over a local area network (LAN) to one of the printers selected for printing the job. In particular, LANs provide a means by which users running dedicated processors are able to share resources such as printers, file servers and scanners. Integration of shared resources has been a problem addressed by LAN managers. LAN managers have made different network protocols such as Ethernet and Token Ring transparent to devices running different network protocols. LANs also have a variety of print drivers emitting different page description languages (PDLs), which are directed to specific printer devices.

With any PDL or image format, there will inevitably be a step of "decomposition" of the PDL or image format data into a form usable by an output device, such as a laser printer. Printing hardware requires a stream of binary data to be input into it. Thus, the instructions within the image format, such as to "print a white line," will eventually have to be translated into the actual binary code so that, for example, this code can be applied to the modulation of a laser source in a raster output scanner, or applied sequentially to individual ejectors in an ink-jet printer.

In the prior art, U.S. Pat. No. 5,075,874 discloses a printer having a plurality of physical ports which accept hardware cables. Each port is dedicated to a particular PDL emulation, although it is possible to temporarily reconfigure a particular port to accept a different PDL.

U.S. Pat. No. 5,142,667 discloses a control system for a digital copier-printer which schedules the printing of specific images in large jobs. The control system determines whether certain images being scanned into the copier should be retained in disk storage until requested by the printing hardware. The overall system is designed to minimize the number of pitch skips in the printer, which are caused when a desired image is not available at a particular moment.

U.S. Pat. No. 5,170,340 discloses an electronic reprographic system having a plurality of hardware and software system components, which a control system construes as various virtual machines. There is included in the system a scheduler for managing resources and setting priorities for various virtual machines defined by the system to process job requests in an efficient manner. The scheduler causes memory from a first virtual machine in the system to be distributed to a second virtual machine in the system when the second virtual machine requests more memory than is normally allocated to it.

U.S. Pat. No. 5,226,112 discloses a system by which original data in different PDL's can be processed by the same processor. When the processor is requested to decompose data of a particular PDL, the processor retrieves suitable translation instructions for the particular PDL, in order to interpret the data. When a second set of image data, of a different PDL than the first image data, is submitted to the processor, the processor retrieves another interpretation code for interpreting the second set of data.

U.S. Pat. No. 5,228,118 discloses a printing system having at least one interpreter and a data processor connected to the printing device. The data processor sends to the printer an inquiry signal asking the printer to send back to the data processor interpreter identification data representative of the interpreter or interpreters. The data processor selects a printer driver compatible with the requested interpreter, on the basis of the interpreter identification data. The printer sends the interpreter identification data to the data processor in response to the inquiry signal.

U.S. Pat. No. 5,276,780 discloses a data filing system for filing documents in a data file memory. The data filing system includes means for registering each document size in the data file memory together with image data.

U.S. Pat. No. 5,293,466 discloses a printer which is capable of interpreting print jobs in various printer control languages. The printer samples a portion of each print job and analyzes the sampled portion of the print job statistically to identify the printer control language in which the print job is encoded.

U.S. Pat. No. 5,327,526 discloses a print job control system which processes print requests to set an order of priority for printing print jobs. A print job manager checks the print request and determines which print option is selected and manipulates the queue identifier associated with print jobs and enters them into a print queue table.

U.S. Pat. No. 5,371,837 discloses a virtual printer system in which a user on a network is allowed to select a printer default configuration from a plurality of preset default configurations to control a printer on the network. By this technique, print data for a plurality of printer configurations can be sent through a single printer network interface to a single printer.

The Xerox "DocuTech" ® network printing system includes provision for combining multiple files together as a unique print job, even if the different files are of different PDL file types or TIFF image files. Separate files can be submitted to the network server, and then submitted by the network server to printer hardware as a single output document.

According to one aspect of the present invention, there is provided an apparatus for processing image data for submission to printing hardware. A decomposition facility outputs decomposed data relating to images desired to be printed. A buffer retains decomposed data output by the decomposition facility. A CPU facility provides CPU cycles of operation to the decomposition facility. Control means apportion a predetermined number of CPU cycles over time to the decomposition facility, in response to a predetermined amount of data being in the buffer.

Figure 1:
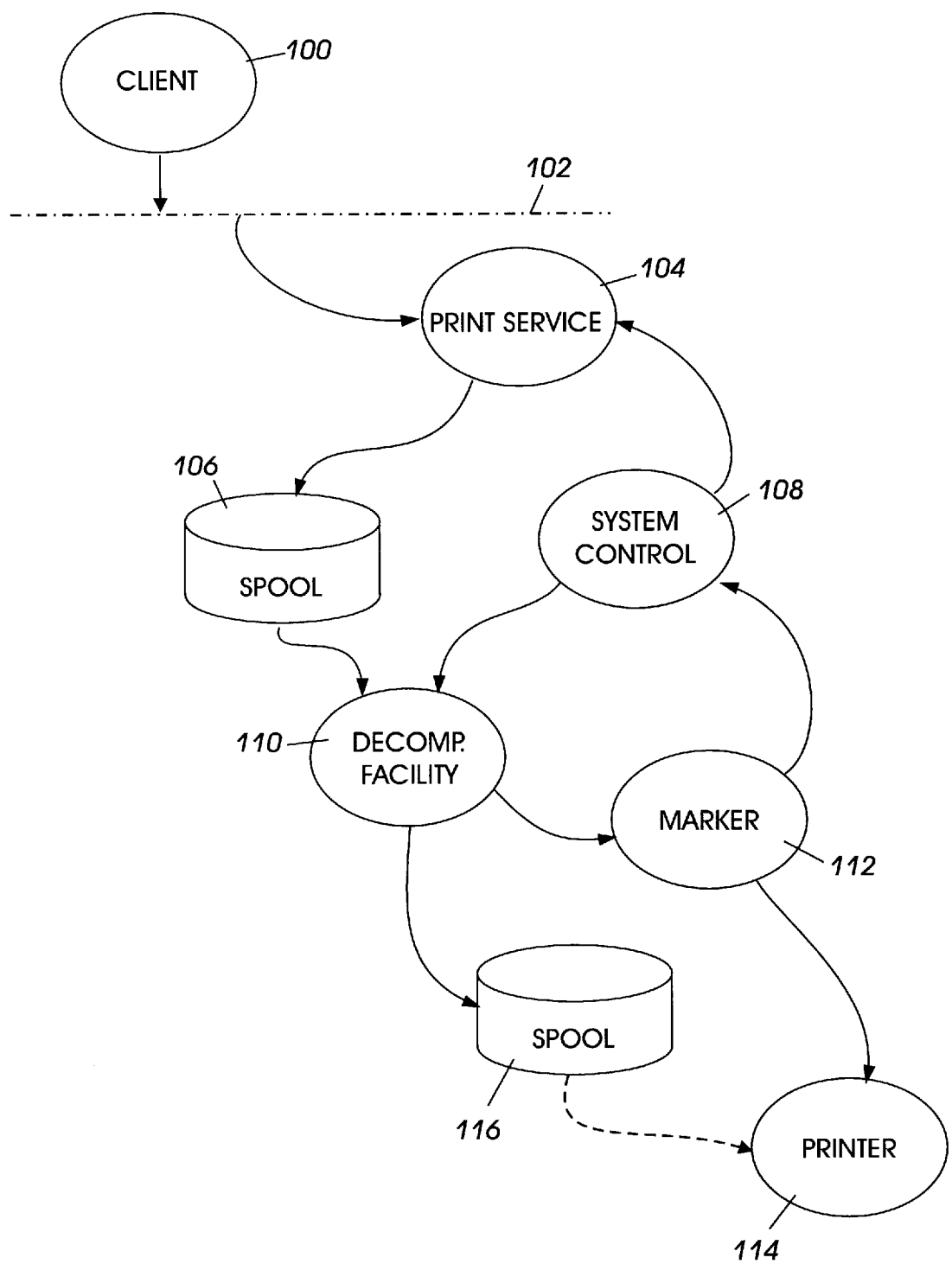
FIG. 1 is a diagram giving a general overview of an on-demand network printing system incorporating the present invention.

FIG. 1 is a diagram giving a general overview of an on-demand printing system incorporating the present invention. A client indicated as 100 will typically have a print job to be submitted to the printing system. This job is typically in the form of a file which is expressed in one of many different commercially-available formats. Typical of such formats are the page description languages or PDLs, such as PostScript or HP-PCL and their respective variants, as well as other formats such as TIFF or ASCII. It is also conceivable that a job to be printed could exist in compressed or uncompressed binary form, such as when the printing system is used as a copier and the data is fed directly from a digital scanner. As used in the present description, a "PDL" will refer to any set of image data submitted for printing, regardless of whether it is in the form of a commercially-available PDL such as PCL or PostScript, or in another format such as TIFF or ASCII. ("PostScript" is a trademark of Adobe Systems, Inc.) Typically, for large-scale on-demand printing systems, the client 100 is one of several clients which each access a network bus 102 which enables the client 100 to contact the printing system as desired. Indeed, several printing systems may exist on a network, and an individual client having a job to be printed will select a printing system capable of handling his particular job.

A printing system on network bus 102 includes a print service 104 which receives the submitted job from client 100 through network 102. The "job" is in the form of at least two portions: the PDL itself, that is the data desired to be printed, which is typically in the form of a PDL or other format, and a "job description" on which the client 100 has specified certain instructions for printing the job. This job description could include, for example, a specification of how many copies are to be made, on what size and color of paper the prints are to be made, into what tray the prints are to be inserted, whether the prints are to be duplexed, collated, stapled, or otherwise finished, etc. The data comprising the job description can include instructions in a "job ticket" separable from the portion of the PDL which defines the image data, and also can include instructions which are embedded within a PDL file.

The print service 104, having received the PDL and the associated job description, directs the PDL to a spool 106 and at least some of the job description data to a system control 108. The PDL retained temporarily on spool 106 remains in the form in which it was submitted, such as in PostScript, HP-PCL, or in another form such as TIFF or ASCII. The PDL is retained in spool 106 until it is, in the case of data in a PDL, decomposed into a form usable by printing hardware. This decomposition, or other interpretation, is performed by what is here referred to as a "decomposition facility" 110, which may include several independently-operable decomposers, each dedicated to a different PDL, in a manner which will be described in detail below.

System control 108 interprets the desired specifications from the job description to control the decomposition facility 110 and also what is here defined as a "marker" 112. Marker 112 controls the printing hardware so that the image embodied in the PDL is caused to print out by the printer hardware 114 according to the instructions in the job ticket. System control 108 also controls the decomposition facility 110 to remove the PDL from spool 106, decompose the data according to the required decomposer in decomposition facility 110, and make the decomposed data available for use by the printing hardware 114. System control 108 is also the site in which certain other functions, such as scheduling a plurality of individual jobs, or determining what available printing hardware is capable of carrying out the desired requirements of a particular job, are carried out.

Figure 2:
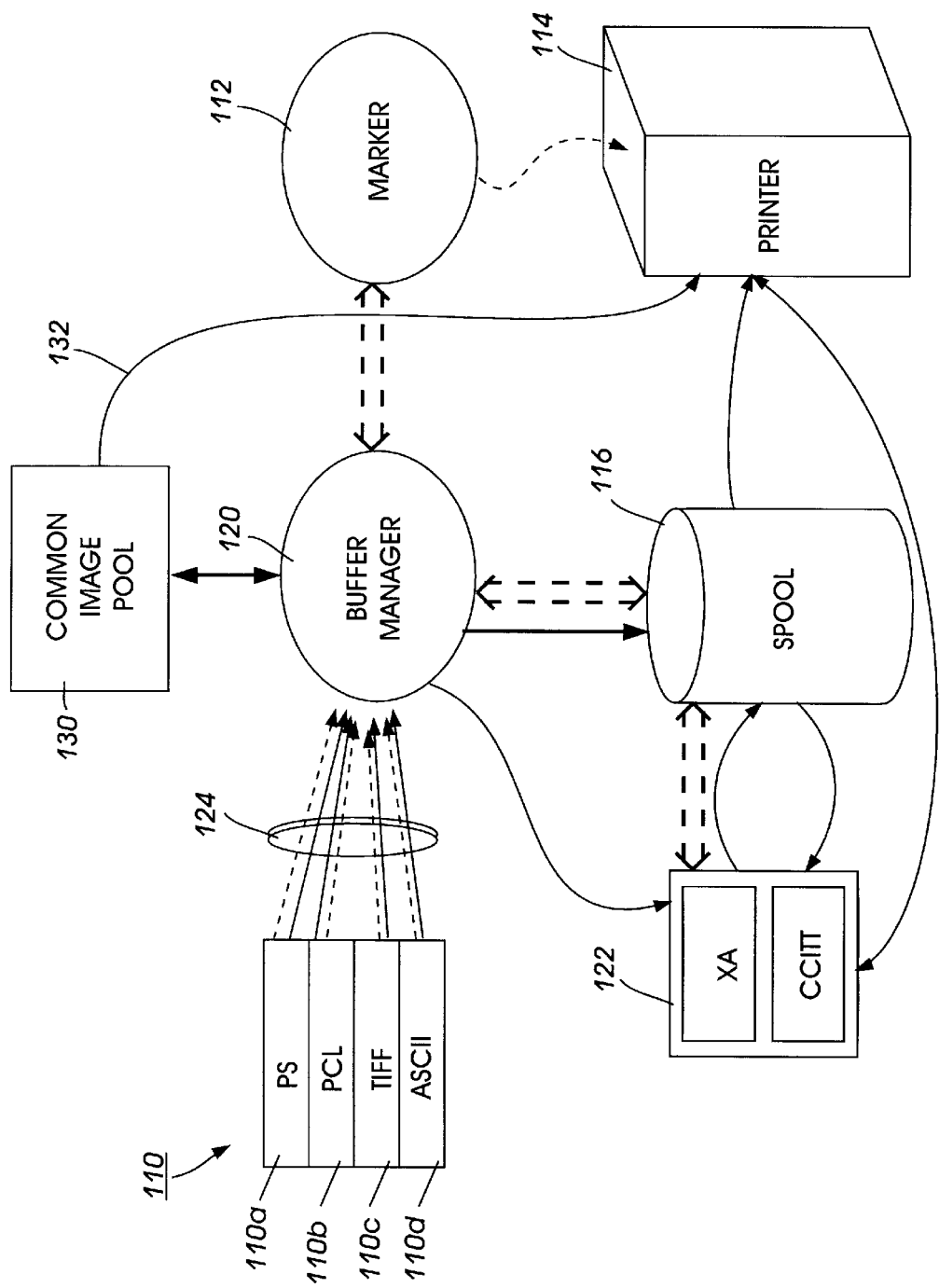
FIG. 2 is a systems diagram showing the basic elements of a preferred embodiment of a decomposing and marking system according to the present invention.

FIG. 2 shows some of the previously-mentioned elements of the printing system of the present invention, with the addition of a buffer manager indicated as 120 and a compression element indicated as 122. Under the convention of FIG. 2, streams of image data, regardless of the degree of compression thereof, are indicated by solid arrows, while data affecting the control of the PDL is shown by broken arrows.

In the detailed view of FIG. 2, the decomposition facility 110 is here shown as four separate and independent decomposers 110a, 110b, 110c, and 110d. Each independent decomposer 110a–110d has the function of processing input data (from spool 106 as shown in FIG. 1) according to a specific PDL or other format. As shown in FIG. 2, decomposer 110a is a PostScript interpreter, 110b is a PCL interpreter, and 110c and 110d interpret TIFF and ASCII codes respectively. Different decomposers, specific to different formats to be interpreted, will be activated as needed by the data being removed from the spool 106. In order to determine which particular decomposer is required for a particular set of data, either different required decomposition facility can be specifically called into action by use of "guessing" algorithms associated with some controller of the decomposition facility 110. Such "guessers," such as detecting "%!" commands to identify PostScript files, are known in the art. It may also be desirable, in certain situations, to provide multiple decomposers of the same type, such as multiple PostScript interpreters, which may be used simultaneously in parallel, thereby increasing the total throughput speed of the system.

After a PDL file from spool 106 is decomposed or interpreted by one of the appropriate decomposers in decomposition facility 110, the output is digital data which can be used to operate, for example, a xerographic or ink-jet marking engine in printer hardware 114. These data streams are indicated as 124. In a network environment, and where individual jobs are of relatively large size and may require special handling such as for collating and stapling, the decomposed PDL often must be retained temporarily until marker 112 requests that the data be sent to the printer hardware 114. In the illustrated embodiment, this decomposed data is retained in a buffer in the form of discrete page images, each page image corresponding to an image to be printed on one page by printing hardware 114. (One skilled in the art will appreciate that a "page" in this context could refer to an image on one side of a duplex sheet, or one page image in a signature.) Buffer manager 120 is a software construction which accepts any of these data streams 124 and controls the storage of the binary data on either spool 116 or image pool 130. (As used in the claims herein, a "buffer" refers to any memory which temporarily retains decomposed PDL data from decomposition facility 110. Thus, in the illustrated embodiment, either spool 116 or common image pool 130 can be said to form at least part of a "buffer." Alternately, a particular specified portion of a larger memory or set of memories can be construed as a "buffer" for purposes of the claims.)

Common image pool 130, which has special functions which will be described in detail below, acts as an initial buffer functionally immediately downstream of the decomposers in decomposition facility 110. A completely uncompressed bit map image, at a typical resolution, of a page to be printed is typically about 4 MB in size; thus, data emerges at various times from the different decomposers 110a–d in 4 MB batches. In typical prior-art decomposers, each decomposer is provided with its own dedicated 20 MB buffer at its output end, to retain the uncompressed data until requested by some other part of the system. The common image pool 130 in effect is a replacement for the individual buffers associated with each decomposer: instead of each individual decomposer 110a–d in decomposition facility 110 retaining data by itself, all data is sent to the common image pool 130, which typically has a capacity of 40 MB. An advantage of using a common image pool, as opposed to separate buffers for each decomposer in decomposition facility 110, is that different decomposers of different types output data at different rates, and a common image pool 130 allows relatively faster decomposition facilities to be unconstrained by limits on buffer space. In effect, a common image pool such as 130 allows the amount of memory apportioned to each decomposer 110a–d to be proportional to the rate at which an individual decomposer outputs data. Further, a common image pool such as 130 causes no memory to be "wasted" because the memory is dedicated to a particular decomposer that is not in use at a particular time.

In a preferred embodiment of the present invention, buffer manager 120 takes page images from common image pool 130 and sends them on to printing hardware 114 when the page images are requested by marker 112. In low-demand situations, marker 112 typically requests page images at a rate comparable to the rate the images enter image pool 130. In high-demand situations, however, as would be found in network printing systems, page images (i.e. decomposed PDLs) may have to wait for a particular desired printing hardware 114 on the network to become available, and therefore are taken by buffer manager 120 from common image pool 130 for storage on spool 116.

The decomposed PDLs stored on spool 116 are preferably in the form of compressed binary data, as opposed to the bits which are used to directly operate hardware, or the original PDL language. In one practical embodiment of the present invention, a PDL on spool 116 is stored either in CCITT format, or else in a proprietary "Xerox Adaptive" format. In order to perform this compression, there is provided a compression element 122, typically in the form of a hardware card which includes means for compressing or decompressing data as desired in either the CCITT or Xerox Adaptive format. Compression element 122 could be in the form of software instructions as well. Generally, just before the data is placed on spool 116, buffer manager 120 activates the compression element 122 to compress the data; similarly, as the decomposed and compressed PDL is removed from spool 116 to operate printer hardware 114, the data can be decompressed also by compression element 122, as can be seen by the solid arrows in FIG. 2. It will further be noted that some types of printer hardware 114 include a decompression element as a part thereof, so that the data stream to printer hardware 114 in some cases need not be completely decompressed.

As is known in the art of high-volume on-demand printing equipment, printing hardware 114 may respond to many sets of instructions as to exactly how the finished job is desired. For example, a typical high-volume printer may include a number of trays in which to place the finished prints, and may include any number of means of "finishing" the prints, such as stapling or binding. Further, a job may require a combination of different types of available print stock, such as colored papers, tab stock, and cardboard covers. All of these finishing requirements, which are present on the original job description data (such as on a separate job ticket or embedded in the PDL) submitted to print service 104, are ultimately carried out by software instructions from marker 112 to control the individual motors, paper diverters, etc., in the printer hardware 114. The instructions from marker 112 are illustrated by the broken line arrow to printer hardware 114. The software inputs to marker 112 include a quantity of job description information which marker 112 receives from system control 108 in FIG. 1, and ultimately from the job description submitted by client 100 (which, as mentioned above, can include instructions on a job ticket, and/or instructions embedded in the original PDL). Among these job description instructions received by marker 112 are the output destination of what trays in which the finished prints are to be deposited; the finishing requirement, such as stapling, binding, etc.; and the number of copies required. Other job description data could include whether or not the job is intended to be duplexed (printed on two sides of each page), and what type or combination of types of paper stock is desired. It is fairly typical that printing a booklet, for example, will require white regular-weight stock for the inner pages, and heavier colored stock for the cover. Many of these job description instructions ultimately submitted to marker 112 will be manifest in specific instructions to hardware within the printer hardware 114, such as to paper of a particular type from one stack or another as the job is being printed.

In addition to the job description instructions input into marker 112, the marker 112 interacts with buffer manager 120 to coordinate the operation of the printer hardware 114 (most specifically, in the sense of drawing the proper paper stock for printing a particular page, and directing the printed page to the correct finisher, such as a stapler) with the stream of PDL from spool 116. The marker 112 must interact with buffer manager 120 so that the right PDL is used to print an image on the right sheet at a particular time. A key function of buffer manager 120 is, as its name implies, to keep track of what PDL is located where within spool 116, so that the correct data can be placed into and retrieved from spool 116 as necessary.

Common image pool 130, because it effectively stands at the "intersection" of the three largely independent processes of decomposition (by decomposition facility 110), compression (by compression element 122), and the functions of marker 114, can be used to regulate the relative activities of decomposition, compression, and printing. Because these three functions, performed at various places in the system, may operate at different effective rates under different circumstances, it is important, for the efficiency of the system as a whole, that these three functions can be regulated relative to each other for most efficient total output. The amount of data retained in common image pool 130 can thus be an important tool for regulating the entire system.

Before discussing how common image pool 130 can be used to regulate the system, the underlying hardware of one possible embodiment of the system of FIG. 2 will be described.

Figure 3:
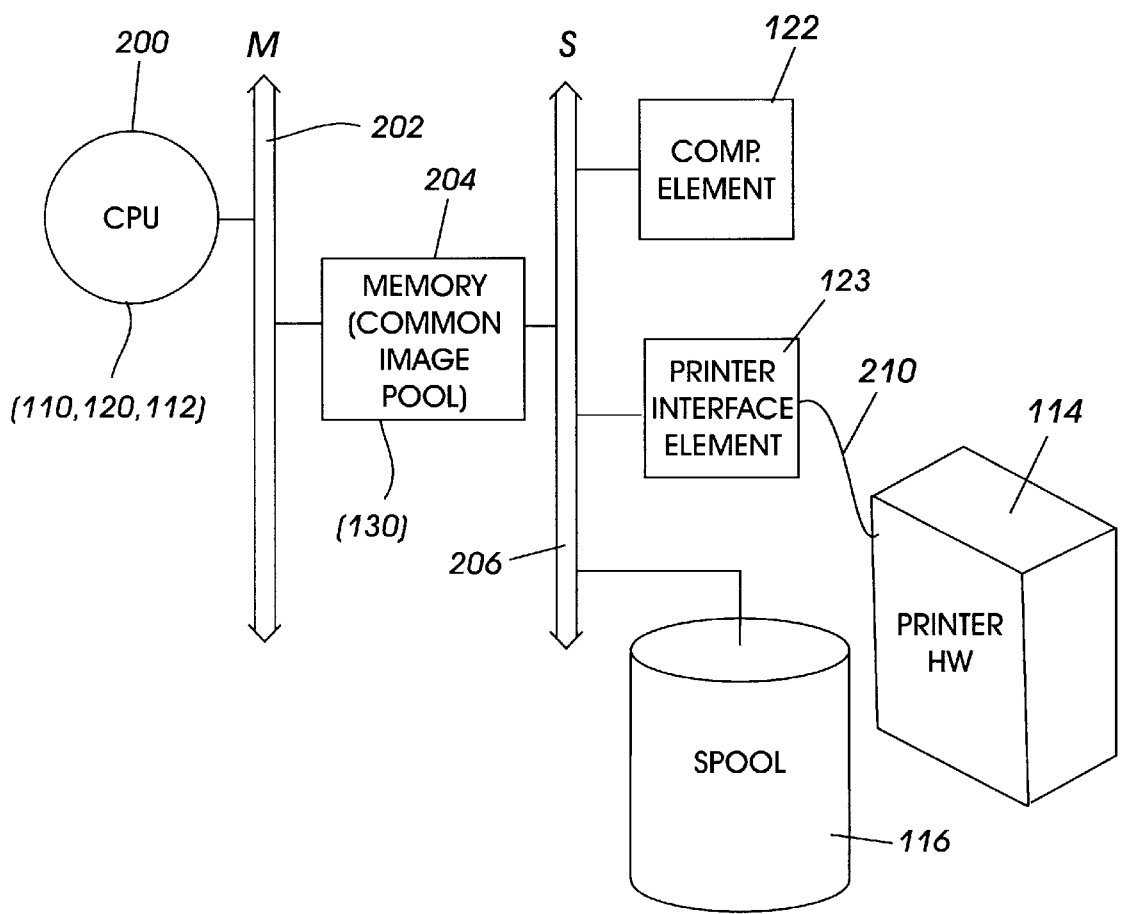
FIG. 3 is a simplified diagram showing a possible arrangement of the essential hardware elements underlying the systems diagram of FIG. 2.

FIG. 3 is a simplified circuit diagram showing the general hardware manifestation of the different systems shown in FIG. 2 as they would be embodied, for example, on a SPARC workstation. A CPU indicated as 200 resides on an "M-bus" 202 where it can access a memory 204. Memory 204, in turn, resides on what is known as an "S-bus" 206. Also accessing S-bus 206 is the compression element 122, which has been described above, and a large memory which acts as spool 116, the function of which has also been described above. A printer interface element 123, in turn, is typically connected via a cable 210 to the printing hardware 114.

Important elements of the functional system shown in FIG. 2, such as decomposition facility 110, buffer manager 120, and marker 112, are software constructs which run on CPU 200. (In a more practical embodiment of the system shown in FIG. 3, there may be several CPUs; in the claims herein, any CPU or combination of CPUs working together are defined as a "CPU facility.") Memory 204 is the site of, among other elements, the common image pool 130. It is clear that PDLs retained in common image pool 130 in memory 204 must pass through S-bus 206 in order to be converted to Xerox Adaptive language and sent to printing hardware 114, or else to be compressed into CCITT in the card containing compression element 122 and then sent, again through the S-bus 206, to spool 116. On the whole, it is evident that any procedure described above in reference to FIG. 2 will require that relatively large amounts of data travel on M-bus 202 and S-bus 206, and further that large amounts of PDL data will be successively moved onto and off of memory 204.

In a practical situation, the three independent functions of the network printing system, decomposition, compression, and operating the printing hardware, are each competing for the "resources" of the hardware. Among these resources are the proportion of CPU cycles apportioned respectively to operating the decomposition facilities 110, sending data to compression element 122, and operating the printing hardware. Further, there is a limitation on "bus bandwidth," that is, the amount of time the M-bus 202 and S-bus 206 apportion to the three functions. Finally there is competition among the three functions for "memory bandwidth," which is the speed in which certain identified bytes are moved on and off of memory 204.

It is a key function of the present invention to set up a system by which, in order to obtain maximum efficiency of the entire system, the three functions of decomposition, compression, and operating the hardware, are each apportioned an optimal number of CPU cycles, bus bandwidth, and memory bandwidth. According to the present invention, there is provided, preferably as part of buffer manager 120, a facility which monitors the amount of data being retained in common image pool 130 over time, and then makes decisions about operating, such as via CPU 200, the decomposition facilities 110, and the compression element 112.

According to a simple embodiment of the present invention, and referring back to FIG. 2, the facility within buffer manager 120 monitors the amount of data in common image pool 130. As mentioned above, common image pool 130 represents a common buffer for all uncompressed decomposed data as it emerges through streams 124 from one or another decomposer 110a–d. From common image pool 130, depending on momentary circumstances, the data is either sent directly to printing hardware 114, or is compressed through compression element 122 and stored on spool 116 for subsequent retrieval. In a low-demand situation, where the decomposed PDL can be sent on to printing hardware 114 at a rate comparable to which it is being decomposed in decomposition facility 110, the amount of data in common image pool 130 will remain very low. If common image pool 130 is 40 MB in capacity, in low-demand situations there will typically never be more than two page images, totaling 4–8 MB, in common image pool 130 at any time. Thus, the common image pool 130 will at this stage be operating at no more than 20% of capacity. In such as case, the data need not be compressed and stored, but rather is sent directly to marking hardware 114 as requested by marker 112.

If the behavior of the decomposition facility 110 is such that large amounts of data are being decomposed at once, common image pool 130 will start filling up. This may happen, for example, in a multi-task job, when multiple decomposers, such as 110a and 110b, are operating simultaneously. When there is a high rate of output from decomposition facility 110, not only does common image pool 130 start to fill up, but the whole system is affected. Conceivably, PDLs can be decomposed faster than printing hardware 114 can output pages. Thus, in this example, the facility in buffer manager 120 will take an indication that common image pool 130 is consistently running at 50% of capacity as a signal that the PDL data should start being compressed by compression element 122, and stored in spool 116. In the present example, incidental to the diversion of data to spool 116, the data must be compressed by compression element 122.

This activation of compression element 122, as directed by the facility in buffer manager 120, has a number of short-term beneficial effects. First, the rate of data being emptied from common image pool 130 will increase, because data is now being diverted to spool 116. Incidental to this, the activation of compression element 122 consumes cycles on the CPU, which are cycles which had previously been dedicated to operating decomposition facility 110. Thus, the activation of compression element 122 has the effect of apportioning fewer CPU cycles to decomposition, and thereby generally slows down the rate at which data is entering common image pool 130. Because of these factors, once compression element 122 is activated, the amount of data being retained in common image pool 130 goes down.

Further according to a simple embodiment of the present invention, when the amount of data being consistently retained in common image pool 130 goes down to 20%, the facility in buffer manager 120 can be programmed to de-activate compression element 122. This de-activation frees CPU cycles from a compression function and makes them available for decomposition functions, thus increasing the rate at which the decomposition facility 110 enters data into common image pool 130. In effect, this operation apportions more CPU cycles to decomposition, relative to compression. Similarly, this de-activation frees up both bus bandwidth and memory bandwidth. A more sophisticated implementation of this principle is to provide "soft landings" for the operation of the compression element. For example, the facility can be programmed to apportion a lower proportion of CPU cycles to the compression element 122 if the amount of data in common image pool 130 is consistently between 20% and 40% of capacity, without deactivating the compression element 122 completely.

If the rate of output between decomposition facility 110 and the acceptance of data from other parts of the system are such that, even with compression, image pool 130 continues to fill up, other techniques for regulating the entire system can be used. For example, if the common image pool exceeds 80% of capacity, or fills up entirely, the facility in buffer manager 120 can simply halt decomposition facility 110, such as by stopping apportioning any CPU cycles to it. This will at least give the common image pool 130 time to empty out.

Alternately, a more sophisticated system could provide "soft landings" when imbalances in the system cause the amount of data in common image pool 130 to reach predetermined threshold levels of less than 100%. For example, one technique would be to have the facility, when the common image pool is operating at 80% of capacity, slow down the decomposition facility 110 without stopping it completely, such as by apportioning fewer CPU cycles to decomposition facility 110. This lower-apportioning of the decomposition facility 110 can be provided by moving the decomposition facility 110 to a lower priority in the operating system of the CPU, particularly relative to giving instructions to compression element 122 or in sending instructions to printer hardware.

In some instances a problem different from that above described may afflict the system as a whole: instead of the decomposition facility 110 working very fast and overloading the common image pool, the decomposition facility 110 may, for various reasons, be operating very slow, to such an extent that printing hardware 114 is not receiving any data when it is requested by marker 112. In such a case, there will inevitably be little or no data in common image pool 130. Under such a situation, one solution is to instruct printing hardware 114 (assuming it is a xerographic printer) to skip image-size pitches on its rotatable photoreceptor belt (not shown), thus decreasing its demand for image data. This "skip pitch" command can be delivered by the facility in buffer manager 120 when there are periods in which the common image pool 130 is completely empty. The "soft landing" approach can also be used with the printer hardware 114. For example, if printer hardware 114 is a high-volume printer, with for example a five-pitch photoreceptor belt, the buffer manager, faced with a common image pool in the 10%–20% range, can slightly slow down the data intake of printer 114, such as by skipping one of every five pitches consistently.

One variation to the general concept of the present invention may be useful in systems, such as illustrated in FIG. 2, where decomposition facility 110 includes multiple independent decomposers. Depending on the relative loads and relative image complexities of PDL data sent to different decomposers, one particular decomposer such as 110a–d in decomposition facility 110 may fill up common image pool 130 much faster than other decomposers. It may be desirable to apportion CPU cycles to different decomposers in order to equalize the relative outputs (in page images over time, for example) of different decomposers. For example, if common image pool 130 is in a high-demand situation where it is consistently operating at over 75% of capacity, the buffer manager 120 could be programmed to be sensitive to which single decomposer, if any, has output page images at the highest rate, for example, in the previous five minutes. If it appears that other decomposers are competing with the fast decomposer, the buffer manager 120 can apportion CPU cycles to favor the slower decomposers at the expense of the faster one. Such a provision might be useful, for example, if one knows in advance that a particular decomposer is receiving "difficult" images to decompose, such as graphics or color images, which typically are more time-consuming to decompose than all-text documents or facsimile messages.

While the present invention has been described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

We claim:

1. An apparatus for processing image data for submission to printing hardware, comprising:

a decomposition facility, for outputting decomposed data relating to images to be printed;

a buffer for retaining decomposed data output by the decomposition facility;

a CPU facility for providing CPU cycles of operation to the decomposition facility; and control means for detecting an amount of data in the buffer over time, and apportioning a predetermined number of CPU cycles over time to the decomposition facility, without necessarily idling the decomposition facility completely, in response to the amount of data in the buffer being of a predetermined relationship to a first predetermined nonzero threshold.

2. The apparatus of claim 1, the control means decreasing a number of CPU cycles to the decomposition facility when the amount of data in the buffer is more than said predetermined nonzero threshold.

3. The apparatus of claim 1, the control means increasing a number of CPU cycles to the decomposition facility when the amount of data in the buffer is less than said predetermined nonzero threshold.

4. The apparatus of claim 1, the control means causing printing hardware to skip a proportion of pitches of a rotatable belt on which images are formed when the amount of data in the buffer is not more than said predetermined nonzero threshold.

5. The apparatus of claim 1, further comprising a compression element for compressing data in the buffer, the compression element being operated by the CPU facility; and wherein the control means apportion relative amounts of CPU cycles to the decomposition facility and the compression element, in response to an amount of data in the buffer being of the predetermined relationship to the first predetermined nonzero threshold.

6. The apparatus of claim 1, the decomposition facility including a first decomposer and a second decomposer, the first decomposer and second decomposer being each operable independent of each other and capable of operating simultaneously;

wherein the control means apportion relative amounts of CPU cycles to the first decomposer and second decomposer, without necessarily idling either the first decomposer or the second decomposer completely, in response to an amount of data in the buffer being of the predetermined relationship to the first predetermined nonzero threshold.

7. The apparatus of claim 6, the buffer including a common image pool, the common image pool being a memory immediately downstream of the first decomposer and the second decomposer, and acting as a shared buffer for the first decomposer and the second decomposer.

8. The apparatus of claim 7, the buffer further including a spool, the spool being a memory functionally separate from the common image pool, the apparatus further comprising:

a buffer manager, the buffer manager being selectably operable either to send data in the common image pool directly to printer hardware in response to a request from the marker, or to transfer data from the common image pool to the spool;

the control means being operable to cause the buffer manager to transfer data from the common image pool to the spool, in response to an amount of data in the common image pool being of the predetermined relationship to the first predetermined nonzero threshold.

9. The apparatus of claim 8, further comprising a compression element for compressing data transferred from the common image pool to the spool, the compression element being operated by the CPU facility; and wherein the control means apportion relative amounts of CPU cycles to the decomposition facility and the compression element, in response to an amount of data in the common image pool being of the predetermined relationship to the first predetermined nonzero threshold.

10. The apparatus of claim 1, the buffer including a common image pool immediately downstream of the decomposition facility, and a spool, the spool being a memory functionally separate from the common image pool, the apparatus further comprising:

a buffer manager, the buffer manager being selectably operable either to send data in the common image pool directly to printer hardware in response to a request from the marker, or to transfer data from the common image pool to the spool;

the control means being operable to cause the buffer manager to transfer data from the common image pool to the spool, in response to an amount of data in the common image pool being of the predetermined relationship to the first predetermined nonzero threshold.

11. The apparatus of claim 10, further comprising a compression element for compressing data transferred from the common image pool to the spool, the compression element being operated by the CPU facility; and wherein the control means apportion relative amounts of CPU cycles to the decomposition facility and the compression element, in response to an amount of data in the common image pool being of the predetermined relationship to the first predetermined nonzero threshold.

12. The apparatus of claim 1, the control means altering the proportion of CPU cycles to the decomposition facility when the amount of data in the buffer is above said first predetermined nonzero threshold and below a second predetermined nonzero threshold.

13. The apparatus of claim 5, the control means apportioning a lower proportion of CPU cycles to the compression element if the amount of data in the buffer is below said first nonzero threshold.

* * * * *